US005682541A

United States Patent [19]

Martin

[11] Patent Number: 5,682,541

[45] Date of Patent: Oct. 28, 1997

[54] PREVIEW SYSTEM FOR PRINTED DOCUMENTS

[75] Inventor: Michael M. Martin, Seal Beach, Calif.

[73] Assignee: Canon Business Machines, Inc., Costa Mesa, Calif.

[21] Appl. No.: 249,195

[22] Filed: May 26, 1994

[51] Int. Cl.[6] .......... G06F 17/60

[52] U.S. Cl. .......... 395/768; 395/766

[58] Field of Search .......... 395/148, 149, 395/117, 761, 766–771; 364/419.1; 400/63, 76, 83–85, 709–709.2

[56] References Cited

U.S. PATENT DOCUMENTS

| | | | |
|---|---|---|---|
| 3,545,373 | 12/1970 | Spaulding | 346/25 |
| 3,713,525 | 1/1973 | Troing | 400/718.1 |
| 4,110,794 | 8/1978 | Lester et al. | 358/401 |
| 4,297,022 | 10/1981 | Lester | 347/241 |
| 4,741,633 | 5/1988 | Shibuya et al. | 400/85 |
| 4,864,411 | 9/1989 | Hale et al. | 358/494 |
| 4,977,832 | 12/1990 | Walter | 101/365 |
| 5,040,913 | 8/1991 | Folkens et al. | 400/718.1 |
| 5,091,747 | 2/1992 | Tsai | 399/7 |
| 5,135,095 | 8/1992 | Kocznar et al. | 194/209 |
| 5,164,768 | 11/1992 | Tsai | 399/7 |
| 5,172,988 | 12/1992 | Ledley et al. | 400/83 |
| 5,187,774 | 2/1993 | Ericson | 395/111 |
| 5,215,396 | 6/1993 | Rogers | 400/718 |
| 5,222,431 | 6/1993 | Kawahara | 400/83 X |
| 5,231,579 | 7/1993 | Tsuchiya et al. | 395/769 |
| 5,255,054 | 10/1993 | Tsai | 399/7 |
| 5,297,202 | 3/1994 | Kapp et al. | 380/9 |
| 5,297,254 | 3/1994 | Arai et al. | 345/157 |
| 5,363,480 | 11/1994 | Usami et al. | 395/779 |
| 5,400,157 | 3/1995 | Won | 349/152 |
| 5,444,828 | 8/1995 | Kataoka | 395/117 |

FOREIGN PATENT DOCUMENTS 5-221054 8/1993 Japan .

*Primary Examiner*—Anton W. Fetting
*Attorney, Agent, or Firm*—Fitzpatrick, Cella, Harper & Scinto

[57] ABSTRACT

A word processing system having a transparent display for previewing printed documents includes a keyboard for inputting character data and format data, a read only memory for storing process steps for displaying and printing input character data in accordance with the input format data, a processor for processing the input character data and the input format data in accordance with the stored process steps, and a display for previewing printed documents. The transparent display comprises a transparent display for displaying characters, a backlight background for supporting a blank form and a printed circuit board connected to the perimeter of the display glass. The transparent display is configured so as to accommodate the passage of a blank form between the front glass and the support plate so that characters displayed on the front glass appear superimposed over the supported blank form.

20 Claims, 5 Drawing Sheets

PREVIEW SYSTEM FOR PRINTED DOCUMENTS

BACKGROUND OF THE INVENTION

1. Field of the Invention

The present invention relates to a system for previewing printed documents before the documents are actually printed. More particularly, the present invention relates to a word processing system in which, before a document is printed on a ruled blank form, the document can be displayed and previewed so as to assist in aligning characters on the ruled blank form.

2. Description of the Related Art

Word processing systems such as stand-alone word processors or personal computers having word processing capabilities permit an operator to input characters, display the input characters, edit the displayed characters, and print the displayed characters. At times, the displayed characters are to be printed onto a blank form which consists of a pre-printed blank form or a ruled blank form. On those occasions, the operator must attempt to manipulate the displayed characters so that the output of characters from the word processing system is appropriately aligned with its intended location within the pre-printed blank form or onto the appropriate lines of the ruled blank form.

For the most part, aligning the characters into the appropriate locations within a pre-printed blank form or placing characters on the appropriate line on a ruled blank form is not only time-consuming but prone to alignment errors. That is, attempting to align displayed characters from a display screen to positions and lines in a form or a ruled blank form is very troublesome since displayed characters and printed characters do not generally have a one-to-one location correspondence.

Some word processing systems utilize character based displays which display characters in unchangeable font style and size which may not correspond to the font style and size of the characters to be printed. This lack of correspondence between displayed and printed characters compounds the alignment problem mentioned above. As a result, time spent in aligning displayed characters with positions in a blank form is wasted if the print font style and size requires either less or more space for each printed character.

In an attempt to address the foregoing problems, conventional word processing systems include a "typewriter mode" which allows the operator to print character-by-character onto a blank form. However, character-by-character printing is time-consuming and also prone to errors, since the user cannot judge the position of a character until after it has been printed onto the blank form. While the "typewriter mode" is an attempt to address the problem for impact-type word processing systems, word processing systems which utilize either an ink-jet printer or a laser printer cannot utilize the "typewriter mode". That is, word processing systems which include an ink-jet printer cannot print character-by-character since the print head of the ink-jet printer can only stay uncapped for a few seconds at a time, and word processing systems which utilize laser printers cannot use character-by-character printing since a laser printer is designed to print an entire page at one time. As a result, the operator cannot accurately determine where characters will be printed onto the blank form.

In order to overcome the problem of character alignment in word processing systems which utilize either an ink-jet or a laser printer, a "print preview" function is provided which displays, prior to print, how the characters will appear when printed on a blank form. However, the "print preview" function displays the characters as they would appear on a blank form and not on a ruled blank form or a pre-printed blank form. Thus, the "print preview" function cannot be used to align or appropriately position characters onto a ruled blank form or a pre-printed blank form. In addition, the input characters displayed using the "print preview" function may not be in the same font style or size that will be printed on the page and, therefore, an error in aligning the characters will result due to the font style and size of a character.

Heretofore, word processing systems have not permitted a user to preview documents to be printed by superimposing input characters over a pre-printed blank form or ruled blank form to be printed. Consequently, a user must tediously attempt through trial and error to position input characters onto a ruled blank form or a pre-printed blank form, which results in wasted time and paper.

SUMMARY OF THE INVENTION

The present invention addresses the above-noted drawbacks by allowing an operator of a word processing system to preview characters as the characters would appear when printed onto a pre-printed form or a ruled blank form. This aspect provides transparent display backed by a backlight or background which acts as a document support plate such that a feed passageway is formed therebetween. Prior to being printed, the blank form is fed through the feed passageway and character information is displayed on the display such that it is superimposed on the blank form. After the blank form and displayed character information are aligned with respect to each other, the blank form is fed to a printer whereupon the character information is printed onto the blank form in the same relative position as it was displayed.

As a specific example, a word processing system according to the invention includes a keyboard for inputting character and format data, a read only memory which stores process steps for displaying and for printing input character data in accordance with the input format data, a random access memory which stores input character data and format data, a processor which processes the input character data and the input format data in accordance with the stored process step, a printing device and a display which displays the input characters. The display includes a liquid crystal display for displaying input characters, a backlight or background support plate for supporting a blank form, and a printed circuit board which is connected to a perimeter of the liquid crystal display.

According to another aspect, the invention is a method for previewing documents to be printed by a word processing system. The method comprises the steps of inserting a blank form into the word processing system, inputting character data and format data, processing the input character data and the format data in accordance with stored process steps, and displaying the input character data on a transparent liquid display, wherein the displayed characters appear superimposed over the blank form.

This brief summary of the invention is provided so that the nature of the invention may be understood quickly. A fuller understanding may be obtained by referring to the following detailed description of the invention in connection with the appended drawings.

DETAILED DESCRIPTION OF THE PREFERRED EMBODIMENT

Figure 1:
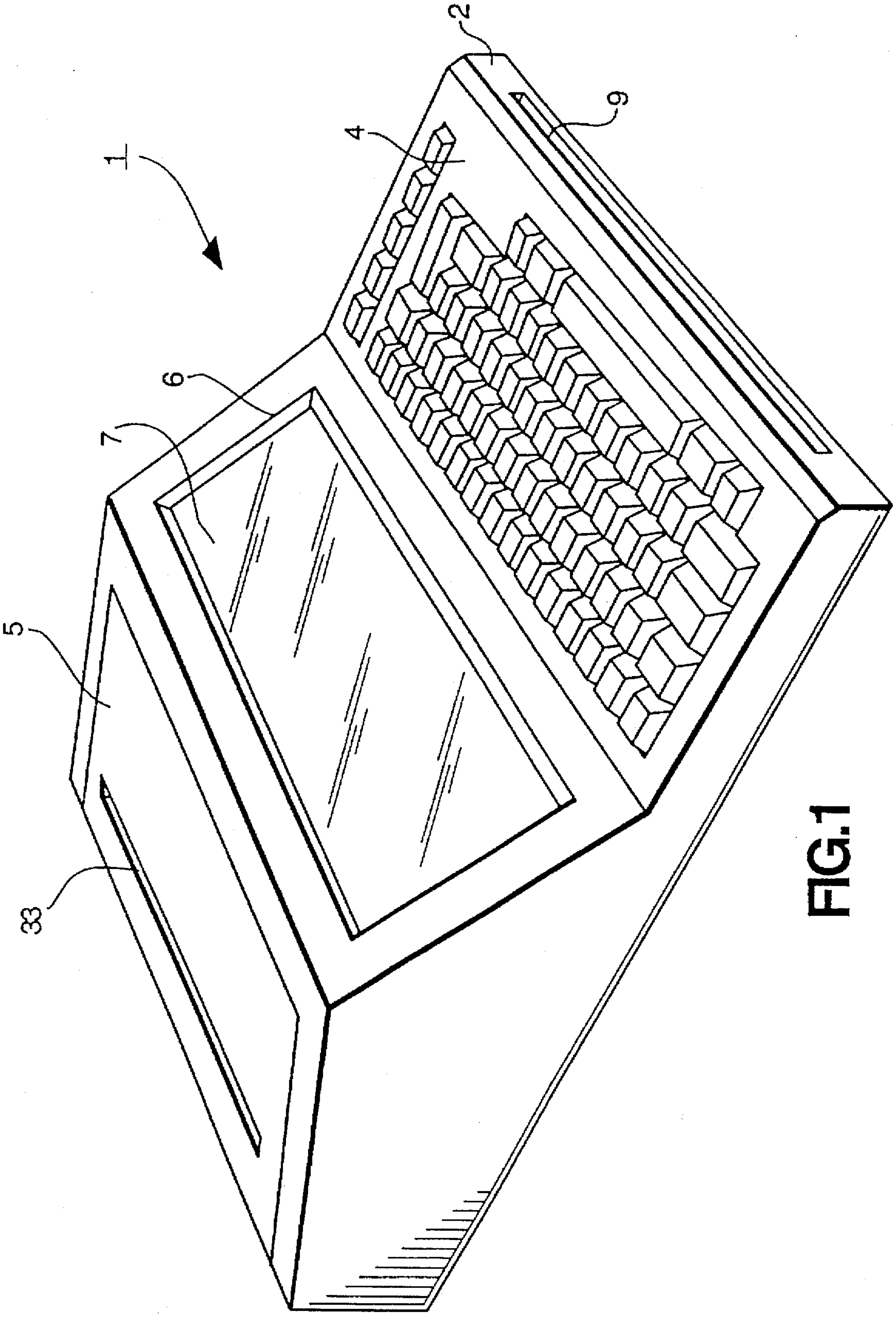
FIG. 1 is a perspective view of a word processing system embodying the present invention.

FIG. 1 is a perspective view of word processing system 1 which includes keyboard 4 and printer 5. Keyboard 4 consists of a typical alphanumeric keyboard in which a plurality of alphanumeric keys are used to input print information such as alphanumeric characters. Keyboard 4 also includes a backspace key, a return key, a space key and a variety of function keys. Alternatively, alphanumeric data can be entered by either voice recognition device or an input device which recognizes handwritten data. The function keys include keys for selecting the printing mode and the font style of characters to be printed. Word processing system 1 stores these input characters in random access memory (RAM) 43, illustrated in FIG. 3, while awaiting to be printed.

Word processing system 1 also includes integral printer 5 which prints out characters input by keyboard 4, as stored in RAM 43. As illustrated in FIG. 1, word processing system 1 includes print means such as a non-impact-type printer (for example, an ink jet printer) or a conventional impact printer.

As shown in FIG. 1, the preferred embodiment of the present invention includes document previewing display 6 for displaying input characters. Display 6 includes liquid crystal display (LCD) glass 7 on which input characters are displayed. The displaying of input characters on display 6 permits the operator to preview the characters as they would appear when printed onto a blank form. The structure and manner of previewing characters on display 6 will be discussed in greater detail with respect to FIGS. 4–6.

Slot 9 is provided at the front end of word processing system 1 for the insertion of a blank form therethrough. At the top back portion of word processing system 1 is slot 33 from which the newly-printed form is output.

In operation, the blank form to be printed on, such as a pre-printed blank form, is inserted into slot 9 at the front end of word processing system 1. The blank form is moved through word processing system 1 along a paper feed path (not shown) and directed into display 6. Once the blank form is positioned within display 6, input characters are displayed on LCD glass 7 and appear superimposed over the pre-printed blank form. The pre-printed blank form and displayed character information may be aligned with respect to each other.

Upon entering of a print command, the blank form is fed to the printer, and the characters, as displayed on LCD glass 7 of display 6, are printed onto the blank form using printer 5. Upon completing the printing operation, the newly-printed form is output through printer output slot 33 at the top of word processing system 1.

Figure 2:
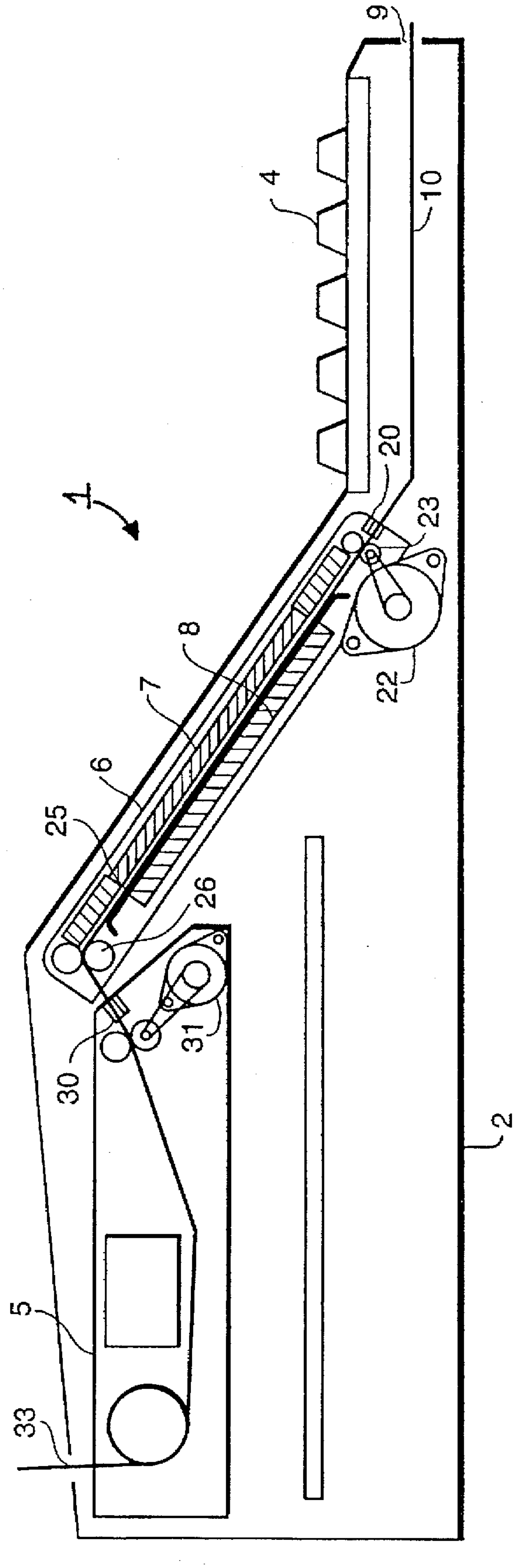
FIG. 2 is a schematic diagram of the internal mechanisms of the word processing system embodying the present invention.

FIG. 2 shows the internal structure of word processing system 1, which performs the operations described above.

As shown in FIG. 2, blank form 10 is inserted into opening 9 of word processing system 1. When blank form 10 is initially inserted into opening 9, sensor 20 senses the leading edge of blank form 10 and outputs a signal to activate paper feed motor 22. Once activated, paper feed motor 22 conveys blank form 10 along paper feed path 25, into display 6 via rollers 23. Once engaged by paper feed motor 22, the movement of blank form 10 along paper feed path 25 can be manually controlled by using the function keys on keyboard 4. The function keys permit the operator to align the blank form by controlling the exact position of blank form 10 to a desired display position within display 6.

Once blank form 10 has been satisfactorily aligned within display 6, the operator can input characters via keyboard 4. When the operator is satisfied with the alignment of all input characters as they appear superimposed over blank form 10, a print command, entered via keyboard 4, actuates paper feed motor 22 so as to forward blank form 10 to printer 5. Paper feed motor 31 inputs blank form 10 into printer 5, at which point the displayed characters are printed onto blank form 10. At the completion of the print operation, the newly-printed form is output through aperture 33 of word processing system 1.

Figure 3:
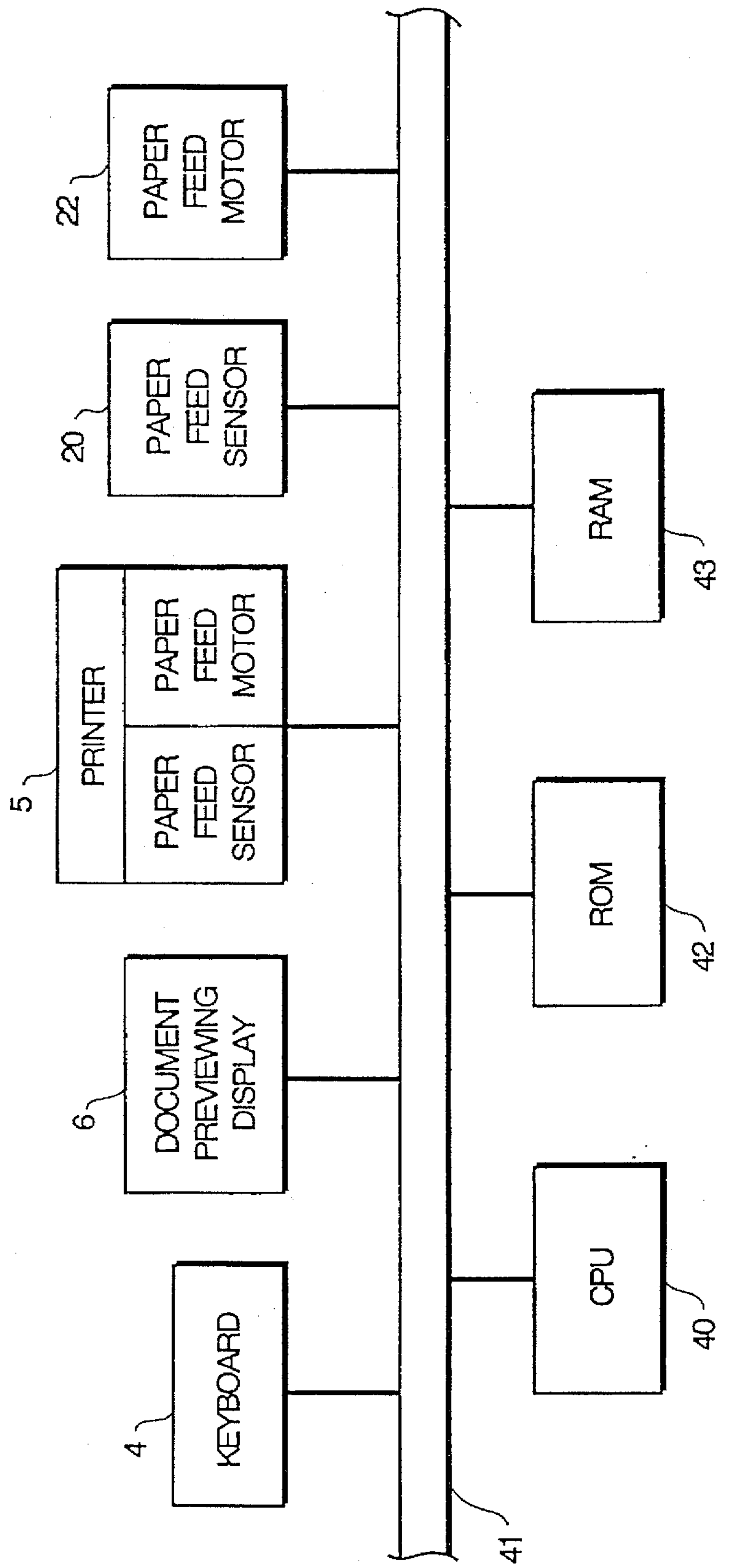
FIG. 3 is a block diagram of the word processing system embodying the present invention.

FIG. 3 is a detailed block diagram showing the internal control and processing components of word processing system 1. As shown in FIG. 3, word processing system 1 includes a central processing unit (CPU) 40 interfaced with computer bus 41. Also interfaced with computer bus 41 is keyboard interface 4, printer interface 5, document previewing display interface 6, paper feed sensor 20, paper feed motor 22, ROM 42 and RAM 43. Word processing system 1 may also be provided with a network interface such as a SCSI port (not shown) which would provide networking capabilities, for example, with a local area network.

ROM 42 contains stored process steps which dictate the various functionality of word processing system 1. Such process steps can be retrieved by CPU 40 upon the actuation of various function keys on keyboard 4. RAM 43 interfaces with computer bus 41 so as to provide a random access memory storage for use by CPU 40 when executing stored program instructions. More specifically, CPU 40 loads process steps from ROM 42 and executes the process steps out of RAM 43. For example, upon depressing the print function key on keyboard 4, CPU retrieves the print process steps from ROM 42 and loads the process steps into RAM 43 for execution. Those process steps are executed so as to activate printer 5 and the various paper feed motors in accordance with the appropriate paper feed sensor signals.

In operation, upon power-up, CPU 40 retrieves the word processing start-up program from ROM 42 in order to initiate word processing system 1. Once word processing system 1 has been initiated, CPU 40 accepts input from keyboard 4. Depending on the keys depressed, CPU 40 either retrieves word processing process steps from ROM 42, to be executed out of RAM 43, or stores the input from keyboard 4, to be displayed.

In the case that the operator desires to preview a document before printing, the operation of word processing system 1 is as follows. Upon inserting blank form 10 into slot 9, sensor 20 senses the leading edge of blank form 10 and outputs a signal to CPU 40 across computer bus 41. CPU 40 acknowledges the signal by sending a signal which activates paper feed motor 22. Paper feed motor 22 operates to feed blank form 10 along a paper feed path using rollers 23 into display 6. After advancing form 10 to the top of display glass, paper feed motor 22 halts the conveying operation until such time as either the print command has been entered by the operator or the operator manually adjusts blank form 10 using the function keys on keyboard 4. In either case, CPU 40 receives the input signal from the function keys and proceeds to execute the desired function by retrieving the appropriate process steps.

Word processing system 1 can also be accessed by a remote workstation via an SCSI interface. Data which is received over the SCSI interface is stored in RAM 43 and retrieved by CPU 40. Depending on the data received, CPU 40 can either display the data or process the data in accordance with the stored process steps stored in ROM 42. For example, word processing system 1 may be used in a local area network as a printer. In this case, the print data is stored in RAM 43 with all the necessary print commands. Both the print data and the print commands are processed by CPU 40. In this manner, an operator working at another terminal who does not have the capabilities of previewing a document to be printed can send his/her document information to word processing system 1 in order to preview his/her document before printing.

Regardless of where the character data originates, CPU 40 controls the feeding of blank form 10 either in response to the movement of the cursor on the display or in response to manual feed signals input by the function keys. In either case, blank form 10 moves along paper feed path 25 so as to maintain a one-to-one correspondence between displayed characters and a designated line location on the form. That is, in order to ensure precise printing of characters in the appropriate line location on blank form 10, CPU 40 must track character position data with the movement of blank form 10 along the paper feed path. In this manner, accurate print position data can be sent to printer 5 via computer bus 41, upon the receipt of a print command.

In addition to storing process steps for controlling operation of word processing system 1, ROM 42 also includes a graphical display which utilizes "What-You-See-Is-What-You-Get" (WYSIWYG) software. The WYSIWYG software permits input characters to be displayed on display 6 in the same font, size and appearance as the characters will appear when printed on blank form 10.

The detailed structure of display 6 will be discussed with respect to FIGS. 4–6.

Figure 4:
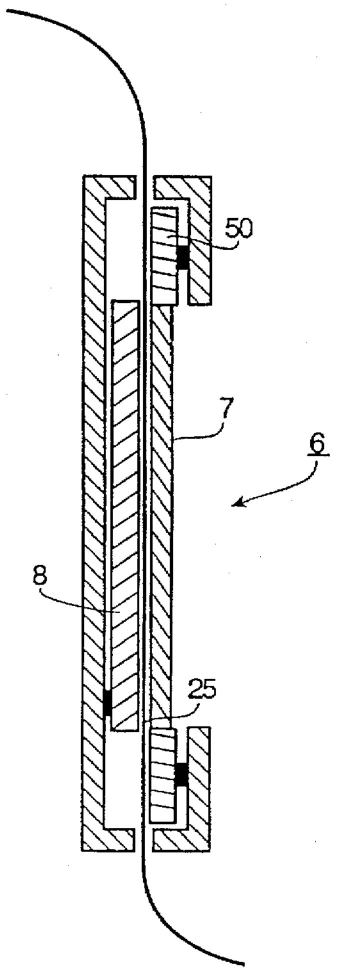
FIG. 4 is a side cutaway view of the display device for previewing printed documents.

FIG. 4 is a representational side view of document previewing display 6. Document previewing display 6 comprises a tape-automated bonding (TAB) type LCD which includes an LCD printed circuit board (PCB) 50. PCB 50 is mounted around the perimeter of LCD glass 7. Also mounted to display 6 behind LCD glass 7 is support plate 8. Support plate 8 is mounted to LCD glass 7 such that an opening exists between LCD glass 7 and support plate 8. As shown in FIG. 4, this opening forms a paper feed path 25 between the LCD glass 7 and support plate 8, which permits blank form 10 to be inserted between LCD glass 7 and support plate 8 by paper feed motor 22. Support plate 8 possibly provide backlight for blank form 10 and LCD glass 7. This configuration makes it possible to display characters on LCD glass 7 while blank form 10 is positioned behind the glass. The effect results in characters being superimposed on blank form 10.

Figure 5A:
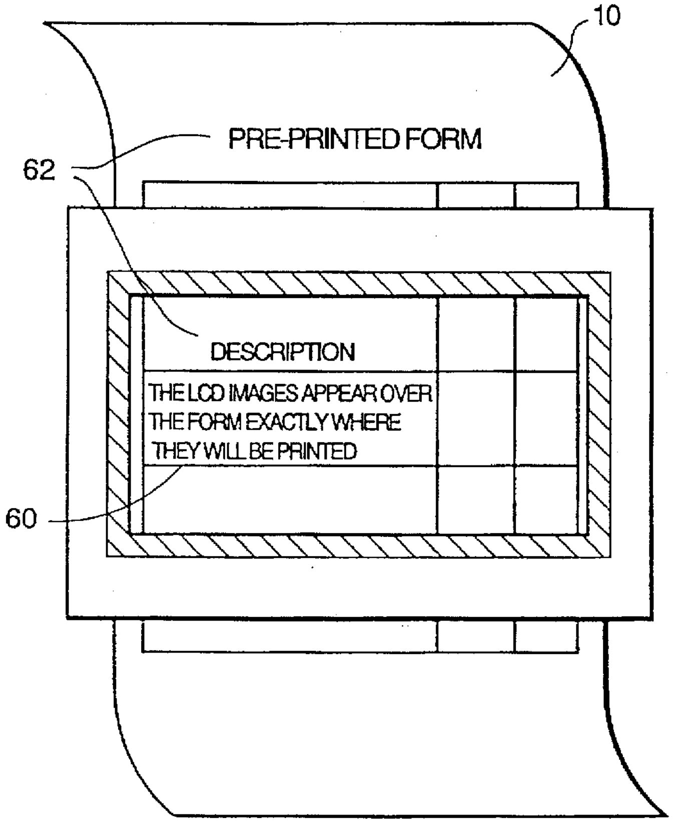
FIG. 5*a* is a front view of the display device for previewing printed documents illustrating how characters are superimposed over a pre-printed blank form.
Figure 5B:
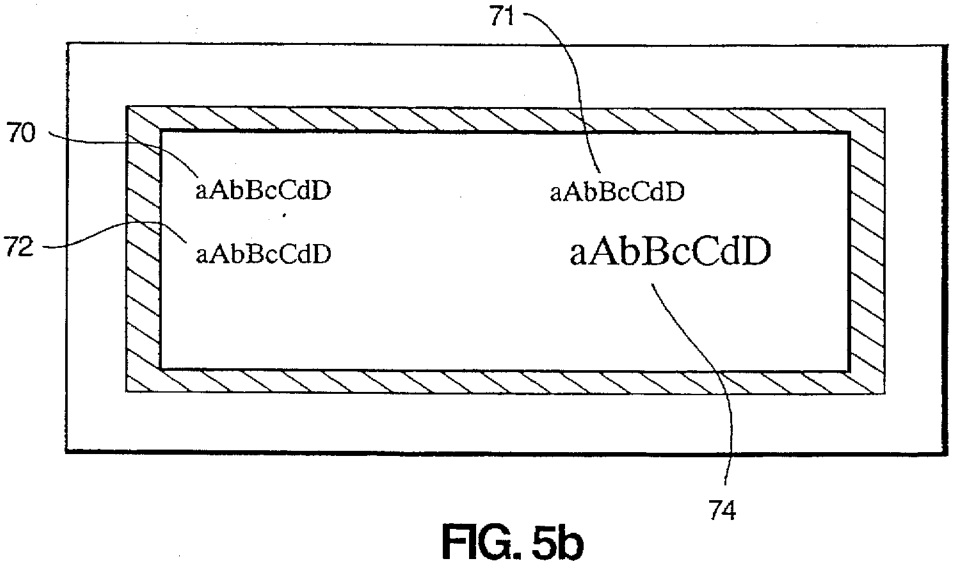
FIG. 5*b* is a front view of the display device for previewing printed documents illustrating displayed characters.

FIGS. 5*a* and 5*b* show in greater detail how documents can be previewed before being printed, using word processor system 1.

In FIG. 5*a*, blank form 10, such as a pre-printed blank form, is inserted into display 6. Using a cursor displayed on display 6, the operator can manually align the cursor with a position in blank form 10. Because the displayed cursor is superimposed over a location in blank form 10, the operator can determine exactly where the input character will be displayed and, ultimately, printed on the blank form. The operator can relocate the position of the cursor on display 6 by using arrow keys provided on keyboard 4. By moving the cursor around display 6, the operator can, in effect, insert characters into positions within blank form 10. As the operator inputs characters via keyboard 4, the characters appear on LCD glass 7 and are superimposed directly over blank form 10. As discussed above, the characters will be printed in the document exactly as previewed prior to printing.

FIG. 5*b* illustrates another feature of the present invention. As shown in FIG. 5*b*, each character is displayed in the same font style and size that will be used when printing the displayed character. That is, WYSIWYG software, stored in ROM 42, is used in the present invention so that the character images which are displayed on the display 6 will be displayed in the same font style and size as those which will be printed onto blank form 10. For example, when using a character based display, common block characters that are 10-point, as shown at 70 in FIG. 5*b*, and common block characters that are 14-point, as shown at 71 in FIG. 5*b*, appear on display 6 to be exactly the same, despite the fact that they are different sizes and occupy a different amount of area on a page. However, WYSIWYG characters that are 10-point, as shown at 72 in FIG. 5*b*, and WYSIWYG characters that are 14-point, as shown at 74 in FIG. 5*b*, appear on display 6 as identical to the characters that will be printed. Although the present invention works without WYSIWYG technology, the benefit of exact placement of characters under all conditions is more fully realized with this feature.

Figure 6:
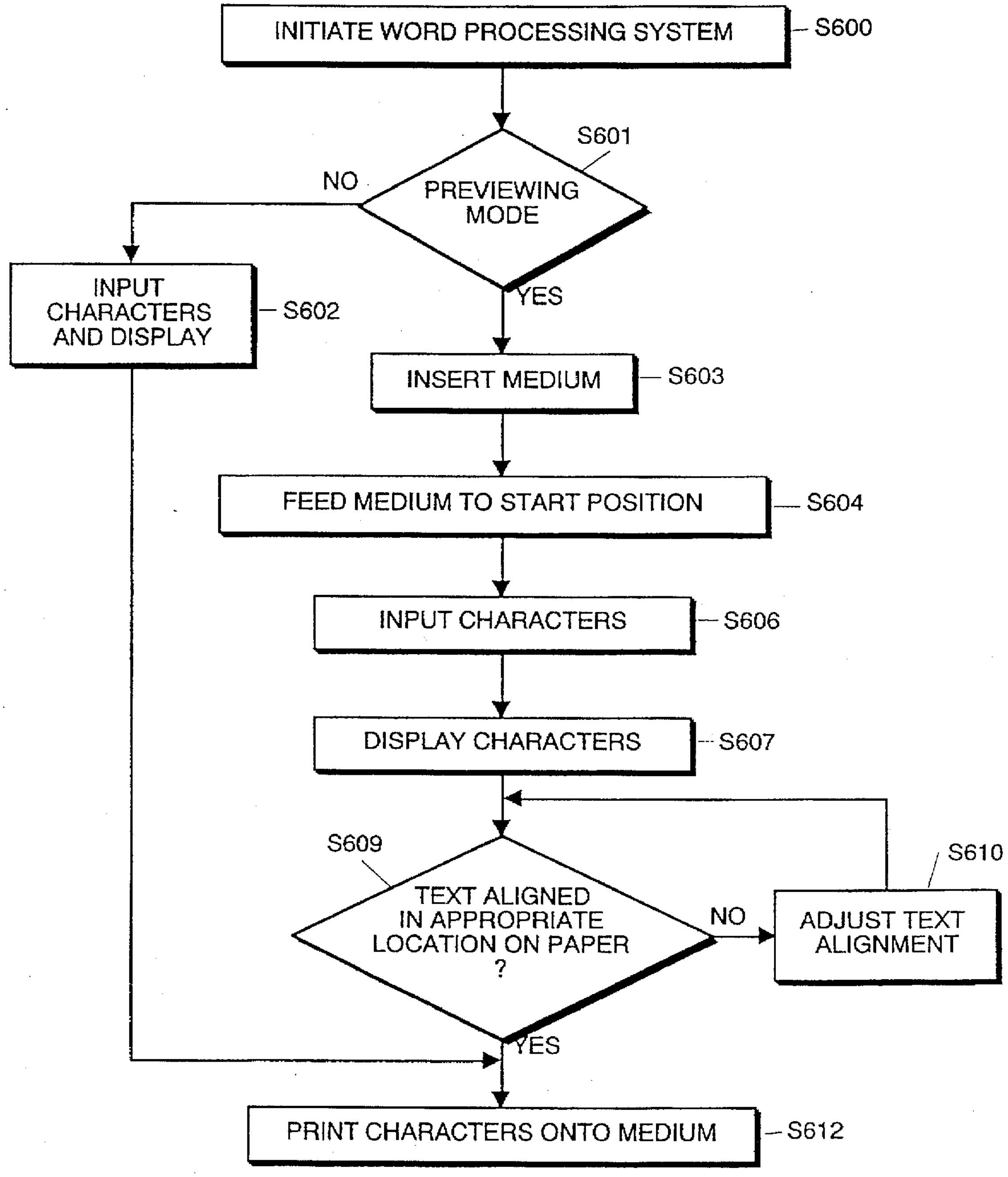
FIG. 6 is a flow chart illustrating the method for aligning and previewing characters to be printed on the blank form using the display device for previewing printed documents.

FIG. 6 is a flow chart which describes the method of aligning characters using document previewing display 6.

Upon power-up, word processing system 1 runs its diagnostic program and initiating process steps in step S600. Once initiated, word processing system 1 prompts the operator to input whether the system should function in a previewing mode in S601. In the case that the operator does not desire to preview printed documents, then in step S602, word processing system 1 operates in a conventional or standard word processing mode. On the other hand, if the previewing mode is selected in step S601, then in step S603, word processing system 1 prompts the operator to insert a blank form into slot 9.

Upon inserting the blank form into slot 9, sensor 20 senses the leading edge of the blank form and paper feed motor 22 is activated by CPU 40. Paper feed motor 22 advances the blank form to a display start position based on a feedback signal from a second sensor along the paper feed path within display 6 (step S604).

In step S606, the operator is permitted to enter characters via keyboard 4. As mentioned previously, characters can appear on the display character-by-character (step S607).

Once a character or characters is/are displayed, the operator may choose, in step S609, to adjust the alignment of the displayed characters and blank form behind LCD glass 7 if the displayed cursor does not line up properly with the ruled lines. In this case, the operator can control the vertical movement of the cursor or blank form by using the appropriate function keys of keyboard 4 to move the cursor or blank form up or down, in step S610.

Until such time as a print command is entered, both the input character data and the display position data are stored in RAM 43. When the operator has completed the entry of characters and is satisfied with the alignment of the characters, in step S612, the blank form is fed to printer 5 and characters are printed onto the blank form.

What is claimed is:

1. A word processing system comprising:

a keyboard for inputting character and format data;

a read only memory for storing process steps for displaying and for printing input character data in accordance with the input format data;

a random access memory for storing input character data and input format data;

a processor for processing the input character data and the input format data in accordance with the stored process steps; and a display for displaying the input character data overlaid upon a blank form, said display comprising a transparent display screen with transparent background, the screen for displaying input character data thereon, a backlight support plate for supporting the blank form, and a printed circuit board for connecting both the transparent display screen and the backlight support plate such that a feed passage for receiving the blank form is formed therebetween.

2. A system according to claim 1, further comprising a printer for printing the displayed input character data in a same relative position as the input character data was displayed overlaid upon the blank form.

3. A system according to claim 2, further comprising a blank form feed path for accepting the blank form and advancing the blank form into the display between the transparent display screen and the support plate and for conveying the blank form into the printer upon the execution of a print command.

4. A system according to claim 3, wherein the blank form is a pre-printed form.

5. A system according to claim 2, wherein the printer is integral with the word processing system and wherein the printer comprises an ink jet printer.

6. A system according to claim 1, wherein the transparent display screen is a tape-automated-bonding-style display.

7. A method for previewing documents to be printed by a word processing system, the method comprising the steps of:

inserting a blank form into a word processing system;

inputting character data and format data;

processing the input character data and format data in accordance with stored process steps; and displaying the input character data on a transparent display screen with transparent background, wherein the displayed character data is overlaid upon the blank form in the case that the blank form is placed behind the screen.

8. A method according to claim 7, further comprising the step of adjusting the input character data such that the displayed character data is appropriately aligned over the blank form.

9. A method according to claim 8, further comprising the step of printing the displayed character data onto the blank form, wherein the input character data is printed onto the blank form in the same relative position as the character data was displayed upon the blank form in the displaying step.

10. A word processing apparatus comprising:

a transparent display means with transparent background and non-transparent displayed images, backed by a support plate such that a feed passage is formed therebetween, for displaying character information;

printing means for printing onto a recording medium;

feeding means for feeding a recording medium from the support plate to the printing means; and control means for causing the transparent display means to display character information on the transparent display means in a position such that the displayed character information is superimposed over the recording medium supported on the support plate in the feed passage, for causing the feeding means to feed the recording medium from the support plate to the printing means, and for causing the printing means to print the displayed character information in the same relative position as it was displayed onto the recording medium.

11. A word processing apparatus according to claim 10, further comprising alignment means for aligning the recording medium while the recording medium is disposed between the transparent display and the support plate.

12. A word processing system for previewing printed documents, comprising:

input means for inputting character and format data;

read only memory means for storing process steps to display input characters and to print displayed characters in accordance with input format data;

random access memory means for storing input character data, format data, and stored process steps to be executed;

transparent display means with transparent background and non-transparent displayed images for displaying input character data;

print means for printing the input character data;

paper feed means for feeding a recording medium along a paper feed path between the transparent display means and the print means; and processor means for processing the character data and format data in accordance with the stored process steps, wherein the process means executes the stored process steps so as 1) to control advancement of the recording medium along the paper feed path from the display means to the print means, 2) to display the input character data on the transparent display means in accordance with the format data such that the displayed character data appears superimposed over the recording medium in a particular relationship to the recording medium, and 3) to print the displayed character data in the same relationship as it appeared superimposed over the recording medium.

13. A word processing system according to claim 12, wherein the input means comprises a keyboard.

14. A word processing system according to claim 12, wherein the input means comprises a voice recognition device.

15. A word processing system according to claim 12, wherein the print means comprises an ink-jet printer.

16. A method for previewing printed documents in a word processing system, the method comprising the steps of:

prompting an operator to input whether the word processing system should operate in a previewing mode;

advancing a recording medium into the word processing system along a paper feed path behind a transparent display having a transparent background and capable of displaying non-transparent images thereon;

inputting character and format data;

displaying the input character data on the display in accordance with the format data;

aligning, in a case that the previewing mode is selected, displayed character data in a desired relationship to the recording medium behind the transparent display; and printing the displayed character data in accordance with the aligning step.

17. A method for previewing printed documents by overlaying characters onto a recording medium positioned within a display which comprises a transparent display screen capable of displaying non-transparent images thereon and a support plate, the method comprising the steps of:

feeding the recording medium along a paper feed path in a word processing system;

inputting character and format data;

storing process steps for displaying and for printing the input character data in accordance with the input format data;

processing the input character data and the input format data in accordance with the stored process steps; and displaying the input character data on the transparent display screen such that the character data overlays the recording medium in the paper feed path.

18. A method according to claim 17, further comprising the step of printing the displayed character data on the recording medium in the same relative position as the character data was overlaid upon the recording medium.

19. A method according to claim 18, wherein the step of feeding includes advancing the recording medium along the paper feed path to a printer upon entering a print command.

20. A method according to claim 17, wherein the step of feeding includes advancing the recording medium along the paper feed path such that the recording medium is transported between the transparent display and the support plate.

* * * * *